US009762904B2

(12) United States Patent
Chen et al.

(10) Patent No.: US 9,762,904 B2
(45) Date of Patent: Sep. 12, 2017

(54) PERFORMING MOTION VECTOR PREDICTION FOR VIDEO CODING

(71) Applicant: Qualcomm Incorporated, San Diego, CA (US)

(72) Inventors: Jianle Chen, San Diego, CA (US); Muhammed Zeyd Coban, Carlsbad, CA (US); Ye-Kui Wang, San Diego, CA (US); Xianglin Wang, San Diego, CA (US); Marta Karczewicz, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1135 days.

(21) Appl. No.: 13/709,555

(22) Filed: Dec. 10, 2012

(65) Prior Publication Data

US 2013/0163668 A1    Jun. 27, 2013

Related U.S. Application Data

(60) Provisional application No. 61/579,465, filed on Dec. 22, 2011, provisional application No. 61/584,096, filed on Jan. 6, 2012.

(51) Int. Cl.
*H04N 19/51* (2014.01)
*H04N 19/196* (2014.01)
(Continued)

(52) U.S. Cl.
CPC ..... *H04N 19/00696* (2013.01); *H04N 19/196* (2014.11); *H04N 19/197* (2014.11);
(Continued)

(58) Field of Classification Search
CPC .................................................. H04N 19/00696
(Continued)

(56) References Cited

U.S. PATENT DOCUMENTS 5,151,784 A   9/1992 Lavagetto et al.
5,742,710 A   4/1998 Hsu et al.
(Continued)

FOREIGN PATENT DOCUMENTS

CN   101924934 A   12/2010
EP    1819173 B1    7/2009
(Continued)

OTHER PUBLICATIONS

International Preliminary Report on Patentability from International Application No. PCT/US2012/069000, dated Mar. 21, 2014, 8 pp.
(Continued)

*Primary Examiner* — Yulin Sun

(57) ABSTRACT

In general, techniques are described for performing motion vector prediction for video coding. A video coding device comprising a processor may perform the techniques. The processor may be configured to determine a plurality of candidate motion vectors for a current block of the video data so as to perform the motion vector prediction process and scale one or more of the plurality of candidate motion vectors determined for the current block of the video data to generate one or more scaled candidate motion vectors. The processor may then be configured to modify the scaled candidate motion vectors to be within a specified range.

40 Claims, 6 Drawing Sheets

(51) Int. Cl.
    *H04N 19/52*     (2014.01)
    *H04N 19/70*     (2014.01)
    *H04N 19/463*    (2014.01)

(52) U.S. Cl.
    CPC .......... *H04N 19/463* (2014.11); *H04N 19/52* (2014.11); *H04N 19/70* (2014.11)

(58) Field of Classification Search
    USPC .................................................. 375/240.14
    See application file for complete search history.

(56) References Cited

U.S. PATENT DOCUMENTS

| | | |
|---|---|---|
| 7,177,356 B2 | 2/2007 | Moni et al. |
| 8,064,520 B2 | 11/2011 | Mukerjee et al. |
| 8,411,750 B2 | 4/2013 | Dane |
| 8,660,176 B2 | 2/2014 | Lee et al. |
| 9,020,030 B2 | 4/2015 | Chen et al. |
| 2006/0120612 A1 | 6/2006 | Manjunath et al. |
| 2006/0251330 A1 | 11/2006 | Toth et al. |
| 2007/0014359 A1 | 1/2007 | Gomila et al. |
| 2008/0063308 A1* | 3/2008 | Sato ............. H04N 5/144 382/300 |
| 2008/0187046 A1 | 8/2008 | Joch et al. |
| 2008/0187179 A1 | 8/2008 | Living |
| 2008/0253457 A1* | 10/2008 | Moore ........... H04N 19/52 375/240.16 |
| 2008/0298466 A1 | 12/2008 | Liu |
| 2010/0316135 A1 | 12/2010 | Jeon et al. |
| 2011/0228853 A1 | 9/2011 | Suzuki et al. |
| 2012/0008688 A1 | 1/2012 | Tsai et al. |
| 2013/0101038 A1 | 4/2013 | Shimizu et al. |

FOREIGN PATENT DOCUMENTS

| | | |
|---|---|---|
| EP | 2793466 A1 | 10/2014 |
| RU | 2395174 C1 | 7/2010 |
| RU | 2434361 C2 | 11/2011 |
| TW | 201132131 A | 9/2011 |
| WO | 03061295 A2 | 7/2003 |
| WO | 2008045633 A2 | 4/2008 |
| WO | 2010036718 | 4/2010 |
| WO | 2011103210 | 8/2011 |
| WO | 2013088697 A1 | 6/2013 |

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Reply to Written Opinion dated Mar. 22, 2013 from international application No. PCT/US2012/069000, dated Sep. 20, 2013, 31 pp.
Second Written Opinion of international application No. PCT/US2012/069000, dated Nov. 20, 2013, 5 pp.
Reply to Second Written Opinion dated Nov. 20, 2013, from international application No. PCT/US2012/069000, dated Jan. 17, 2014, 8 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 2011, JCTVC-G1103_d2, 214 pp.
Coban et al., "Motion Vector Predictor Candidate Clipping Removal," Document JCTVC-G134, 7th Meeting: Geneva, CH, Nov. 21-30, 2011, 9 pp.
International Search Report and Written Opinion—PCT/US2012/069000—ISA/EPO—Mar. 22, 2013, 12 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Lim et al., "Dynamic range restriction of temporal motion vector," Document JCTVC-E142, 5th Meeting, Geneva, CH, Mar. 16-23, 2011, 7 pp.
Sullivan, Meeting report of the fifth meeting of the Joint Collaborative Team on Video Coding (JCT-VC), Geneva, CH, Mar. 16-23, 2011, Document JCTVC-E_Notes_d6, 162 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (For FDIS & Last Call)," 10th Meeting: Geneva, CH, Jan. 14-23, 2013, JCTVC-L1003_v34, 310 pp.
Chen J., et al., "Range restriction of motion vector predictor", 8. JCT-VC Meeting; 99. MPEG Meeting; Feb. 1, 2012-Feb. 10, 2012; San Jose; (Joint Collaborative Team on Video Coding of ISO/ IEC JTC1/SC29/WG11 and ITU-T SG.16 ); URL: http://wftp3.1tu.int/av-arch/jctvc-site/,, No. JCTVC-H0555, Jan. 21, 2012 (Jan. 21, 2012), XP030111582.

* cited by examiner

PERFORMING MOTION VECTOR PREDICTION FOR VIDEO CODING

This application claims the benefit of U.S. Provisional Application No. 61/579,465, filed Dec. 22, 2011 and U.S. Provisional Application No. 61/584,096, filed Jan. 6, 2012, each of which is hereby incorporated by reference in its entirety.

TECHNICAL FIELD

This disclosure relates to video coding and, more particularly, motion compensation aspects of video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), and extensions of such standards, to transmit and receive digital video information more efficiently. New video coding standards, such as the High Efficiency Video Coding (HEVC) standard being developed by the "Joint Collaborative Team-Video Coding" (JCT-VC), which is a collaboration between MPEG and ITU-T, are being developed. The emerging HEVC standard is sometimes referred to as H.265, although such a designation has not formally been made.

SUMMARY

In general, this disclosure describes techniques for restricting the range of motion vector candidates used in a motion vector prediction process to be within a specified range. Motion vector prediction is commonly employed in video coding as a way of improving the efficiency with which motion estimation is performed. Rather than perform a search for blocks in reference frames that match a current block by performing what is commonly referred to as "motion estimation," the video coder may determine these candidate motion vectors from blocks that are spatial or temporal neighbors to the current block of video data and select one of these candidate motion vectors as the motion vector predictor for the current block of video data. In some instances, these candidate motion vectors may be scaled. When a scaled candidate motion vector is selected as the motion vector predictor, the techniques may enable the video coder to restrict the range of one or more of a horizontal component and a vertical component of this scaled candidate motion vectors.

In one example, a method of coding video data comprises determining a plurality of candidate motion vectors for a current block of the video data so as to perform a motion vector prediction process, scaling one or more of the plurality of candidate motion vectors determined for the current block of the video data to generate one or more scaled candidate motion vectors and modifying the scaled candidate motion vectors to be within a specified range. The method further comprises selecting one of the plurality of candidate motion vectors as a motion vector predictor for the current block of the video data and coding the current block of video data based on motion vector predictor.

In another example, a video coding device configured to perform a motion vector prediction process to code video data comprises a processor configured to determine a plurality of candidate motion vectors for a current block of the video data so as to perform the motion vector prediction process, scale one or more of the plurality of candidate motion vectors determined for the current block of the video data to generate one or more scaled candidate motion vectors, modify the scaled candidate motion vectors to be within a specified range select one of the plurality of candidate motion vectors as a motion vector predictor for the current block of the video data and code the current block of video data based on motion vector predictor.

In another example, a video coding device configured to perform a motion vector prediction process to code video data comprises means for determining a plurality of candidate motion vectors for a current block of the video data so as to perform the motion vector prediction process and means for scaling one or more of the plurality of candidate motion vectors determined for the current block of the video data to generate one or more scaled candidate motion vectors. The video coding device further comprises means for modifying the scaled candidate motion vectors to be within a specified range, means for selecting one of the plurality of candidate motion vectors as a motion vector predictor for the current block of the video data, and means for coding the current block of video data based on motion vector predictor.

In another example, a non-transitory computer-readable storage medium has instruction stored thereon that, when executed, cause one or more processors to determine a plurality of candidate motion vectors for a current block of the video data so as to perform a motion vector prediction process, scale one or more of the plurality of candidate motion vectors determined for the current block of the video data to generate one or more scaled candidate motion vectors, modify the scaled candidate motion vectors to be within a specified range, select one of the plurality of candidate motion vectors as a motion vector predictor for the current block of the video data and code the current block of video data based on motion vector predictor.

The details of one or more examples are set forth in the accompanying drawings and the description below. Other features, objects, and advantages will be apparent from the description and drawings, and from the claims.

DETAILED DESCRIPTION

Figure 1:
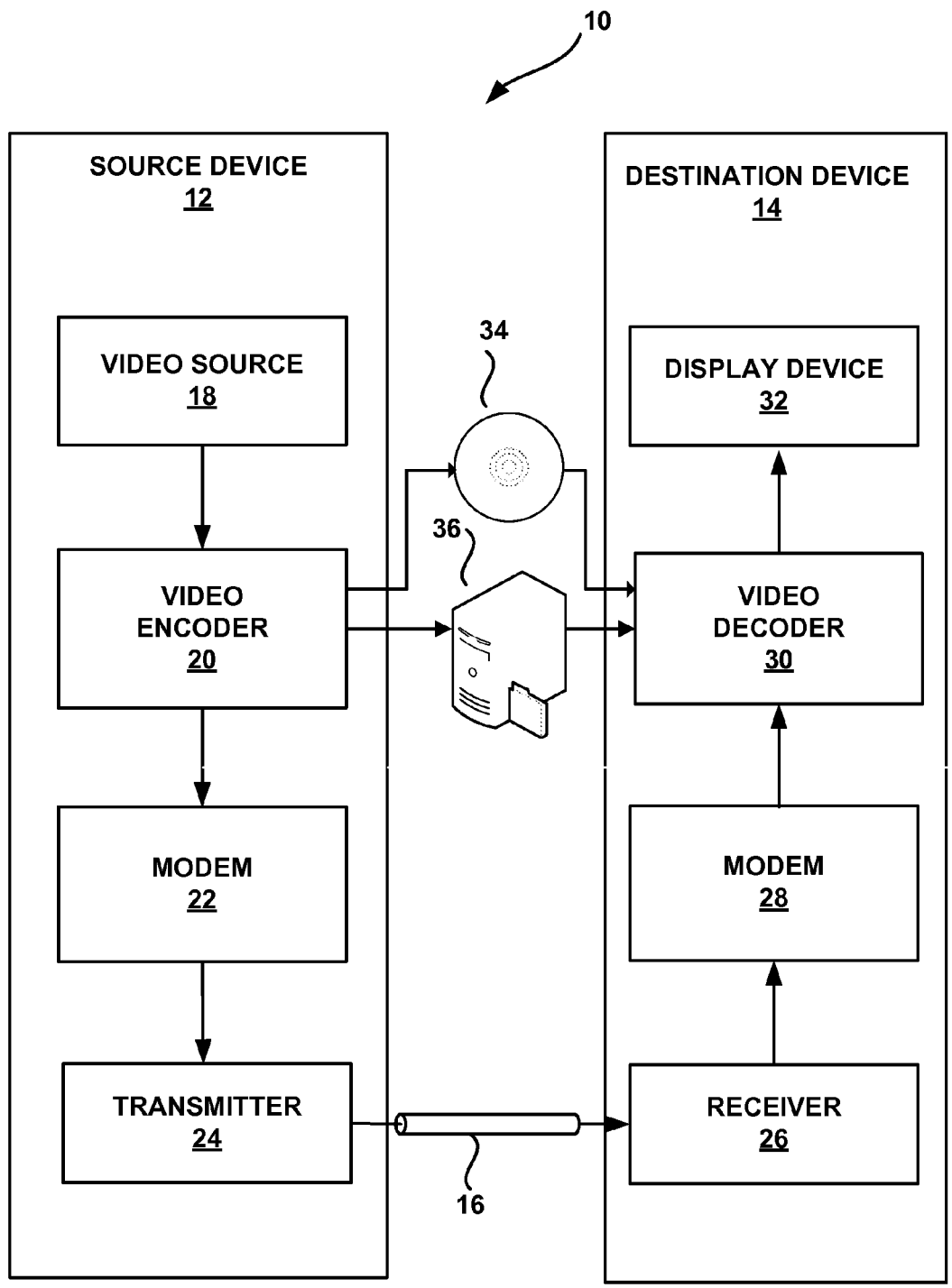
FIG. 1 is a block diagram illustrating an example video encoding and decoding system that may be configured to utilize the techniques described in this disclosure for restricting the range of candidate motion vectors when performing a motion vector prediction process.

Embodiments of the techniques described in this disclosure enable video coders (which may represent a term used in this description to refer to one or both of a video encoder and a video decoder) to restrict the range of a selected candidate motion vectors to be within a specified range when performing a motion vector prediction process. In other words, the techniques enable the video coder to determine a list of candidate motion vectors (where these candidate motion vectors may also be referred to as "motion vector predictor candidates" and the list may be referred to as a "candidate list") for a current block of video data and select one of the candidate motion vectors in this list to represent the motion vector predictor (MVP) for the current block of video data. The video coder may then determine whether the selected candidate motion vector has been scaled. Upon determining that this selected candidate motion vector has been scaled, the video coder may then determine whether a horizontal component and/or vertical component of the selected candidate motion vector is included within a specified range of horizontal component values and/or a specified range of vertical component values, respectively. These specified ranges may effectively represent what may be referred to as a horizontal displacement limitation and/or a vertical displacement limitation. If not included within the specified range of horizontal component values and/or the specified range of vertical component values, the video coder may then clip the values so that the horizontal and/or vertical component values are included within the specified range of horizontal component values and/or the specified range of vertical component values.

In this way, the techniques may modify the candidate list generation process of what may be referred to as a motion vector predictor candidate clipping process. For example, the video coder may clip a vertical component of a candidate motion vector to stay within bounds of a motion vector range. Similarly, the video coder may clip a horizontal component of the candidate motion vector to stay within the bounds of the motion vector range. Additionally, the video coder may scale a motion vector to stay within the bounds of the motion vector range. These techniques may be applied to some or all of the intermediate candidate motion vectors, or only to a final selected motion vector predictor for a current video block.

In other words, when a candidate motion vector of the candidate list points to a prediction block located beyond a motion vector displacement limitation, the video coder (which may also be referred to as a "video coding device") may clip or otherwise truncate the value of the candidate motion vector. The video coder may then code the current video block based on a selected clipped candidate motion vector of the candidate list.

By limiting or otherwise restricting the range of horizontal and/or vertical component values of the selected candidate motion vector in certain instances (such as when this selected candidate motion vector is scaled), the techniques may ensure that the horizontal and/or vertical motion vectors do not require more than a certain number of bits to express their signed integer values. In other words, the component values of motion vectors, which are signed integer values, are commonly expressed using 16 bits. Video decoders, therefore, allocate 16 bits per motion vector component when defining motion vectors. Allowing motion vectors to exceed 16 bits may significantly complicate video decoder design when implemented in hardware, as additional physical memory needs to be provided to store those motion vector components requiring more than 16 bits to express.

Additionally, by restricting the range of motion vector components in certain instances to be within a specified range, the techniques may promote more efficient utilization of memory bandwidth. To illustrate, given that video coding of a frame of video data typically proceeds in raster-scan order (which is commonly in reading order from top-to-bottom, left-to-right), limiting the vertical component of motion vectors may restrict how much video data of the reference frame to which the motion vector refers is required to be loaded into on-chip memory. A smaller motion vector vertical component may be, in raster scan video coding, considered an effective way to restrict the amount of on-chip memory that is required in hardware implementations of the video coder. Overly large motion vector vertical components may result in instances where multiple blocks each reference entirely different portions of the same reference frame that then require the video decoder to frequent swap these different portions of the reference frame between off-chip and on-chip memory. By restricting the range of motion vector components in certain instances, the techniques may promote more efficient utilization of memory bandwidth.

FIG. 1 is a block diagram illustrating an example video encoding and decoding system 10 that may be configured to utilize the techniques described in this disclosure for restricting the range of candidate motion vectors when performing a motion vector prediction process. As shown in the example of FIG. 1, system 10 includes a source device 12 that generates encoded video for decoding by destination device 14. Source device 12 may transmit the encoded video to destination device 14 via communication channel 16 or may store the encoded video on a storage medium 34 or a file server 36, such that the encoded video may be accessed by the destination device 14 as desired. Source device 12 and destination device 14 may comprise any of a wide variety of devices, including desktop computers, notebook (i.e., laptop) computers, tablet computers, set-top boxes, telephone handsets (including cellular telephones or handsets and so-called smartphones), televisions, cameras, display devices, digital media players, video gaming consoles, or the like.

In many cases, such devices may be equipped for wireless communication. Hence, communication channel 16 may comprise a wireless channel. Alternatively, communication channel 16 may comprise a wired channel, a combination of wireless and wired channels or any other type of communication channel or combination of communication channels suitable for transmission of encoded video data, such as a radio frequency (RF) spectrum or one or more physical transmission lines. In some examples, communication channel 16 may form part of a packet-based network, such as a local area network (LAN), a wide-area network (WAN), or a global network such as the Internet. Communication channel 16, therefore, generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

As further shown in the example of FIG. 1, source device 12 includes a video source 18, video encoder 20, a modulator/demodulator 22 ("modem 22") and a transmitter 24. In source device 12, video source 18 may include a source such as a video capture device. The video capture device, by way of example, may include one or more of a video camera, a video archive containing previously captured video, a video feed interface to receive video from a video content provider, and/or a computer graphics system for generating computer graphics data as the source video. As one example, if video source 18 is a video camera, source device 12 and destination device 14 may form so-called camera phones or video phones. The techniques described in this disclosure, however, are not limited to wireless applications or settings, and may be applied to non-wireless devices including video encoding and/or decoding capabilities. Source device 12 and destination device 14 are, therefore, merely examples of coding devices that can support the techniques described herein.

Video encoder 20 may encode the captured, pre-captured, or computer-generated video. Once encoded, video encoder 20 may output this encoded video to modem 22. Modem 22 may then modulate the encoded video according to a communication standard, such as a wireless communication protocol, whereupon transmitter 24 may transmit the modulated encoded video data to destination device 14. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later retrieval, decoding and consumption. The storage medium 34 may include Blu-ray discs, DVDs, CD-ROMs, flash memory, or any other suitable digital storage media for storing encoded video. Destination device 14 may access the encoded video stored on the storage medium 34 or the file server 36, decode this encoded video to generate decoded video and playback this decoded video.

File server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. Destination device 14 may access file server 36 in accordance with any standard data connection, including an Internet connection. This connection may include a wireless channel (e.g., a Wi-Fi connection or wireless cellular data connection), a wired connection (e.g., DSL, cable modem, etc.), a combination of both wired and wireless channels or any other type of communication channel suitable for accessing encoded video data stored on a file server.

Destination device 14, in the example of FIG. 1, includes a receiver 26, a modem 28, a video decoder 30, and a display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding the associated encoded video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 of destination device 14 represents any type of display capable of presenting video data for consumption by a viewer. Although shown as integrated with destination device 14, display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

This disclosure may generally refer to video encoder 20 "signaling" the syntax information to another device, such as video decoder 30. It should be understood, however, that video encoder 20 may signal information by associating the syntax elements with various encoded portions of video data. That is, video encoder 20 may "signal" data by storing certain syntax elements to headers of various encoded portions of video data. In some cases, such syntax elements may be encoded and stored (e.g., stored to storage medium 34 or file server 36) prior to being received and decoded by video decoder 30. Thus, the term "signaling" may generally refer to the communication of syntax or other data used to decode the compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

HM refers to a block of video data as a coding unit (CU). In general, a CU has a similar purpose to a macroblock coded according to H.264, except that a CU does not have the size distinction associated with the macroblocks of H.264. Thus, a CU may be split into sub-CUs. In general, references in this disclosure to a CU may refer to a largest coding unit (LCU) of a picture or a sub-CU of an LCU. For example, syntax data within a bitstream may define the LCU, which is a largest coding unit in terms of the number of pixels. An LCU may be split into sub-CUs, and each sub-CU may be split into sub-CUs. Syntax data for a bitstream may define a maximum number of times an LCU may be split, referred to as a maximum CU depth. Accordingly, a bitstream may also define a smallest coding unit (SCU).

An LCU may be associated with a hierarchical quadtree data structure. In general, a quadtree data structure includes one node per CU, where a root node corresponds to the LCU. If a CU is split into four sub-CUs, the node corresponding to the CU includes a reference for each of four nodes that correspond to the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining one or more motion vectors for the PU. A motion vector generally identifies a co-located CU in one or more reference frames, where the term "reference frame" refers to a frame that occurs temporally before or after the frame in which the PU is located. Data for the CU defining the PU(s) may also describe, for example, partitioning of the CU into one or more PUs. Partitioning modes may differ between whether the CU is uncoded, intra-prediction mode encoded, or inter-prediction mode encoded.

The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, a prediction direction that identifies whether the identified reference frame is before or after the current frame, and/or a reference list (e.g., list 0 or list 1) for the motion vector. Alternatively, the data defining the motion vector may describe the motion vector in terms of what is referred to as a motion vector predictor (MVP). A motion vector predictor may include a motion vector of a neighboring PU or a temporally co-located PU. Typically, a list of five candidate motion vectors is formed in a defined manner (such as, listing the candidate motion vectors starting with those having the greatest amplitude to those having the least amplitude, i.e., greatest or least displacement between the current PU to be coded and the reference PU, or listing the candidate motion vectors based on the location, i.e. above blocks, left blocks, corner blocks, temporal blocks), where four of the five candidate motion vectors are spatial motion vectors selected from four neighboring PUs and the fifth candidate motion vector is a temporally co-located motion vector selected from a temporally co-located PU in the reference frame.

While typically the temporal candidate motion vector is co-located in the same portion of the reference frame as that of the current portion in the current frame, the techniques should not be limited strictly to co-located temporal candidate motion vectors. Instead, the techniques may be implemented with respect to any temporal candidate motion vector whether co-located or not. In some instances, the video encoder may identify a temporal candidate motion vector that is not co-located with the current block or portion of the current frame and use this temporal candidate motion vector when performing the motion vector prediction process. Commonly, the video encoder may signal that a non-co-located temporal candidate motion vector has been used or, in some instances, a given context may indicate that a non-co-located temporal candidate motion vector has been used (in which case the video encoder may not signal whether or not a non-co-located temporal candidate motion vector was selected as the MVP).

After forming the list of five candidate motion vectors, video encoder 20 may assess each of the candidate motion vectors to determine which provides the best rate and distortion characteristics that best match a given rate and distortion profile selected for encoding the video. Video encoder 20 may perform a rate-distortion optimization (RDO) procedure with respect to each of the five candidate motion vectors, selecting the one of the candidate motion vectors having the best RDO results as the MVP. Alternatively, video encoder 20 may select one of the five candidate motion vectors stored to the list that best approximates a motion vector determined for the current PU as the MVP.

In any event, video encoder 20 may specify the motion vector using data that comprises an index identifying the selected one of the candidate motion vectors in the list of five candidate motion vectors, one or more reference frames to which the motion vector points (often in list form) and a prediction direction identifying whether the prediction is unidirectional or bi-directional. Alternatively, the data defining the motion vector may only specify the index of the selected candidate motion vector in the list of five candidate motion vectors without specifying the reference frame and the prediction direction, which signals to video decoders that the selected one of the candidate motion vectors is to be used in its entirety for the current PU.

In addition to having one or more PUs that define one or more motion vectors, a CU may include one or more transform units (TUs). Following prediction using a PU, a video encoder may calculate a residual value for the portion of the CU corresponding to the PU, where this residual value may also be referred to as residual data. The residual value may be transformed, quantized, and scanned. A TU is not necessarily limited to the size of a PU. Thus, TUs may be larger or smaller than corresponding PUs for the same CU. In some examples, the maximum size of a TU may be the size of the corresponding CU. This disclosure also uses the term "block" to refer to any one or combination of a CU, PU, and/or TU.

In general, encoded video data may include prediction data and residual data. Video encoder 20 may produce the prediction data during an intra-prediction mode or an inter-prediction mode. Intra-prediction generally involves predicting the pixel values in a block of a picture relative to reference samples in neighboring, previously coded blocks of the same picture. Inter-prediction generally involves predicting the pixel values in a block of a picture relative to data of a previously coded picture.

Following intra- or inter-prediction, video encoder 20 may calculate residual pixel values for the block. The residual values generally correspond to differences between the predicted pixel value data for the block and the true pixel value data of the block. For example, the residual values may include pixel difference values indicating differences between coded pixels and predictive pixels. In some examples, the coded pixels may be associated with a block of pixels to be coded, and the predictive pixels may be associated with one or more blocks of pixels used to predict the coded block.

To further compress the residual value of a block, the residual value may be transformed into a set of transform coefficients that compact as much data (also referred to as "energy") as possible into as few coefficients as possible. Transform techniques may comprise a discrete cosine transform (DCT) process or conceptually similar process, integer transforms, wavelet transforms, or other types of transforms.

The transform converts the residual values of the pixels from the spatial domain to a transform domain. The transform coefficients correspond to a two-dimensional matrix of coefficients that is ordinarily the same size as the original block. In other words, there are just as many transform coefficients as pixels in the original block. However, due to the transform, many of the transform coefficients may have values equal to zero.

Video encoder 20 may then quantize the transform coefficients to further compress the video data. Quantization generally involves mapping values within a relatively large range to values in a relatively small range, thus reducing the amount of data needed to represent the quantized transform coefficients. More specifically, quantization may be applied according to a quantization parameter (QP), which may be defined at the LCU level. Accordingly, the same level of quantization may be applied to all transform coefficients in the TUs associated with different PUs of CUs within an LCU. However, rather than signal the QP itself, a change (i.e., a delta) in the QP may be signaled with the LCU. The delta QP defines a change in the quantization parameter for the LCU relative to some reference QP, such as the QP of a previously communicated LCU.

Following quantization, video encoder 20 may scan the transform coefficients, producing a one-dimensional vector from the two-dimensional matrix including the quantized transform coefficients. Video encoder 20 may then perform statistical lossless encoding (which is commonly referred to by the misnomer "entropy encoding") to encode the resulting array to even further compress the data. In general, entropy coding comprises one or more processes that collectively compress a sequence of quantized transform coefficients and/or other syntax information. For example, syntax elements, such as the delta QPs, prediction vectors, coding modes, filters, offsets, or other information, may also be included in the entropy coded bitstream. The scanned coefficients are then entropy coded along with any syntax information, e.g., via content adaptive variable length coding (CAVLC), context adaptive binary arithmetic coding (CABAC), or any other statistical lossless coding process.

As noted above, the data defining the motion vectors for PUs may take a number of forms. Video encoder 20 may implement different ways by which motion vectors may be expressed to compress motion vector data. Video encoder 20 may implement what is referred to as a "merge mode" to express motion vectors as an index identifying a candidate motion vector as stored to a list of candidate motion vectors constructed in a defined manner. Video decoder 30, in implementing the inverse of this merge mode, receives this index, reconstructs the list of five candidate motion vectors according to the defined manner and selects the one of the five candidate motion vectors in the list indicated by the index as the MVP for the current block of video data being decoded. Video decoder 30 then instantiates the selected one of the candidate motion vector as the MVP for the associated PU at the same resolution of the selected one of the candidate motion vectors and that points to the same reference frame to which the selected one of the candidate motion vector points. In implementing the merge mode, video encoder 20 may not need to perform motion estimation to the full extent necessary to derive a motion vector, specify horizontal and vertical components of the motion vector, the motion vector resolution, the motion vector direction (meaning, whether the motion vector points to a frame temporally before or after the current frame) or the reference frame index, thereby potentially reducing processor cycles required to determine a motion vector and compressing motion vector data.

Video encoder 20 may also implement an adaptive motion vector prediction (AMVP) mode that, similar to merge mode, includes expressing motion vectors as an index identifying one of the candidate motion vectors as an MVP. However, contrary to the merge mode, video encoder 20 may also specify the prediction direction and the reference frame, effectively overriding these portions of the selected one of the candidate motion vectors. In implementing the AMVP mode, video encoder 20 may not need to perform motion estimation to the full extent necessary to derive a motion vector, specify horizontal and vertical components of the motion vector, and the motion vector resolution, thereby potentially reducing processor cycles required to determine a motion vector and compressing motion vector data.

Generally, predecessor video coding standards to the current proposed standard, HEVC, defined various limits to constrain the size of motion vector vertical and horizontal components. These limits may, as noted above, be defined as ranges that restrict vertical and/or horizontal displacement to maximum and minimum values. In HEVC, these motion vector component ranges (denoted commonly as "mvrange") were first proposed and adopted based on the use of these ranges in the predecessor video coding standards, such as H.264. However, more recently, these ranges on horizontal and/or vertical displacement were dropped from HEVC so as to enable motion vectors to refer to generally any portion of the reference frame. Motion vectors were also defined in HEVC have component values that are each 16-bits in length, which typically provided enough bits to express large motion vector component values directed to nearly any portion of the reference frame. By enabling motion vectors to refer to generally any portion of the reference frame, video encoders may perform more exhaustive searches for portions of the reference frame that result in the least amount of residual data (which is another way of saying more efficient compression of the current block of the video data).

Yet, in certain circumstances, limiting the range of motion vectors may be beneficial. For example, when performing one of the above motion vector prediction processes (e.g., merge mode or AMVP mode), one or more of the motion vector candidates may be scaled prior to being added to the candidate list. This scaled motion vector components may then exceed the 16-bit length normally defined for each motion vector component. When such scaled motion vectors are larger than the 16-bit length, video encoder 20 may determine that the merge mode is unavailable or, in other words, that the merge mode cannot be performed. This same issue may arise when performing AMVP mode as one or more of the motion vectors may be scaled when performing AMVP. Limiting use of either or both the merge mode and AMVP mode may result in compression inefficiencies.

In accordance with the techniques described in this disclosure, video encoder 20 may determine a plurality of candidate motion vectors for a current block of the video data so as to perform a motion vector prediction process. That is, video encoder 20 may identify one or more neighboring blocks of the current block of video data (where these neighboring blocks may also be referred to as "candidate blocks of video data" or "candidate video blocks"). Video encoder 20 may identify one or more (and, commonly, four) spatial neighboring blocks and one or more (and, commonly, a single one) temporal neighboring blocks. The location of these spatial and temporal neighboring blocks with respect to the current block is shown below in detail with respect to FIG. 6. After identifying these neighboring blocks, video encoder 20 may then determine motion vectors associated with each of these neighboring blocks, where the motion vectors may represent candidate motion vectors for the motion vector prediction process.

Upon determining these motion vectors, video encoder 20 may, in certain instances, scale one or more of the plurality of candidate motion vectors determined for the current block of the video data to generate one or more scaled candidate motion vectors. To illustrate, when performing a merge mode of the motion vector prediction process, video encoder 20 may determine a motion vector associated with the temporal neighboring block, where this temporal neighboring block refers to a block of video data co-located in the same position of a reference frame as the current block of video data. This reference frame may be associated with a picture order count, which refers to a number assigned to each frame of video data that identifies the order in which the frame is to be displayed relative to the other frames. Commonly, video encoder 20 may scale the temporal candidate motion vector based on the difference in picture order count between the reference frame in which the co-located block of video data resides and the current frame in which the current block of video data resides.

As another example, when performing an advanced motion vector prediction (AMVP) mode of the motion vector prediction process, video encoder 20 may likewise scale the temporal candidate motion vector based on the difference in picture order count between the reference frame in which the co-located block of video data resides and the current frame in which the current block of video data resides. However, as noted above, the AMVP mode of the motion vector prediction process permits various aspects of the candidate motion vectors to be effectively overridden. As a result, in the AMVP mode of the motion vector prediction process, video encoder 20 may override the reference frame associated with spatial candidate motion vectors, which may result in scaling spatial candidate motion vectors based on the difference in picture order count between the specified (or override) reference frame and the current frame in which the current block of video data resides. Accordingly, video encoder 20 may scale both temporal and spatial candidate motion vectors when performing the AMVP mode of the motion vector prediction process.

Video encoder 20 may then restrict the range in of one or more of the scaled candidate motion vectors to be within a specified range prior to selecting one of the plurality of candidate motion vectors as the MVP for the current block. In other words, video encoder 20 may modify the scaled candidate motion vectors to be within a specified range prior to selecting one of the candidate motion vectors as the MVP for the current block. When modifying one or more of the scaled candidate motion vectors prior to selecting the one of the candidate motion vectors as the MVP for the current block, video encoder 20 may modify each of the scaled candidate motion vectors to ensure that these scaled candidate motion vectors are restricted to the specified range (which may also be referred to as "displacement limits"). The specified range, as one example, is specified as [−32768, 32767] in quarter pixel units.

After selecting one of the candidate motion vectors as the MVP for the current block (and potentially modifying the selected one of the candidate motion vectors), video encoder 20 may then encode the current block of video data using the MVP. That is, video encoder 20 may use the MVP to identify a reference block in a reference frame and generate a residual block of video data as the difference between the current block and the reference block. Video encoder 20 may then perform the transform operations noted above to transform this residual block of video data from the spatial domain to the frequency domain, generating a block of transform coefficients. Video encoder 20 may next quantize the transform coefficients, run-length encode the quantized transform coefficients, and entropy encode (which is another way of referring to statistical lossless coding) of the run-length encoded quantized transform coefficients. Video encoder 20 may output this coded video data in a bitstream with associated syntax elements.

Video decoder 30 may receive this bitstream and decode the bitstream in accordance with the syntax elements. Video decoder 30 may generally perform reciprocal operations to those described above with respect to video encoder 20. That is, video decoder 30 may entropy decode each block of encoded video data, perform inverse quantization to de-quantize the block of encoded video data and apply an inverse transform to transform the de-quantized block of encoded video data form the frequency domain to the spatial domain. This transformed block of encoded video data may represent a reconstructed version of the residual data. Video decoder 30 may determine from the syntax elements associated with the current block of encoded video data, which in this instance may refer to the reconstructed version of the residual data, that the motion vector for this current block is to be derived using the motion vector prediction process.

Assuming video decoder 30 determines that the motion vector for this current block is to be derived using the motion vector prediction process, video decoder 30 may then generally perform the same operations as those described above with respect to video encoder 20 to derive the motion vector predictor for the current block of encoded video data. Thus, video decoder 30 may determine a plurality of candidate motion vectors for a current block of the video data so as to perform a motion vector prediction process. That is, video decoder 30 may identify one or more neighboring blocks of the current block of video data. Video decoder 30 may identify one or more spatial neighboring blocks and one or more temporal neighboring blocks. Again, the location of these spatial and temporal neighboring blocks with respect to the current block is shown below in detail with respect to FIG. 6. After identifying these neighboring blocks, video decoder 30 may then determine motion vectors associated with each of these neighboring blocks, where the motion vectors may represent candidate motion vectors for the motion vector prediction process.

Upon determining these motion vectors, video decoder 30 may, in the instances described above with respect to video encoder 20, scale one or more of the plurality of candidate motion vectors determined for the current block of the video data to generate one or more scaled candidate motion vectors. Video decoder 30 may then restrict the range in of one or more of the scaled candidate motion vectors to be within a specified range prior to selecting one of the plurality of candidate motion vectors as the MVP for the current block. In other words, video decoder 30 may modify the scaled candidate motion vectors to be within a specified range prior to selecting one of the candidate motion vectors as the MVP for the current block. When modifying one or more of the scaled candidate motion vectors prior to selecting the one of the candidate motion vectors as the MVP for the current block, video decoder 30 may modify each of the scaled candidate motion vectors to ensure that these scaled candidate motion vectors are restricted to the specified range (which may also be referred to as "displacement limits"). In this way, video decoder 30 may modify the scaled candidate motion vectors to be within a specified range.

Video decoder 30 may determine which of the candidate motion vectors to select based on one or more syntax elements (such as a motion vector predictor index ("mvp_idx") syntax element) associated with the current block of video data (that were previously specified by video encoder 20 in the bitstream). Video decoder 30, using this mvp_idx syntax element for example, may select one of the candidate motion vectors. Video decoder 30 may then reconstruct the current block of video data using the candidate motion vector to identify a reference block of video data, which video decoder 30 then adds to the residual data to reconstruct the current block of video data. Video decoder 30 then stores this reconstructed block of video data.

In this manner, the techniques described in this disclosure may generally enable video coders (either or both, for example, video encoder 20 and video decoder 30) to modify those candidate motion vectors that have been scaled. That is, the techniques may enable such video coders to modify only those candidate motion vectors of a motion vector prediction process to be scaled without modifying or otherwise even further considering those of the candidate motion vectors that have not been scaled. In this respect, the techniques may provide a compromise between modifying all of the candidate motion vectors and modifying none of the candidate motion vectors such that only those candidate motion vectors that have been scaled are considered for modification.

The techniques for restricting motion vector component displacement described with respect to the examples of this disclosure may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission for applications such as video streaming, video playback, video broadcasting, and/or video telephony.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Figure 2:
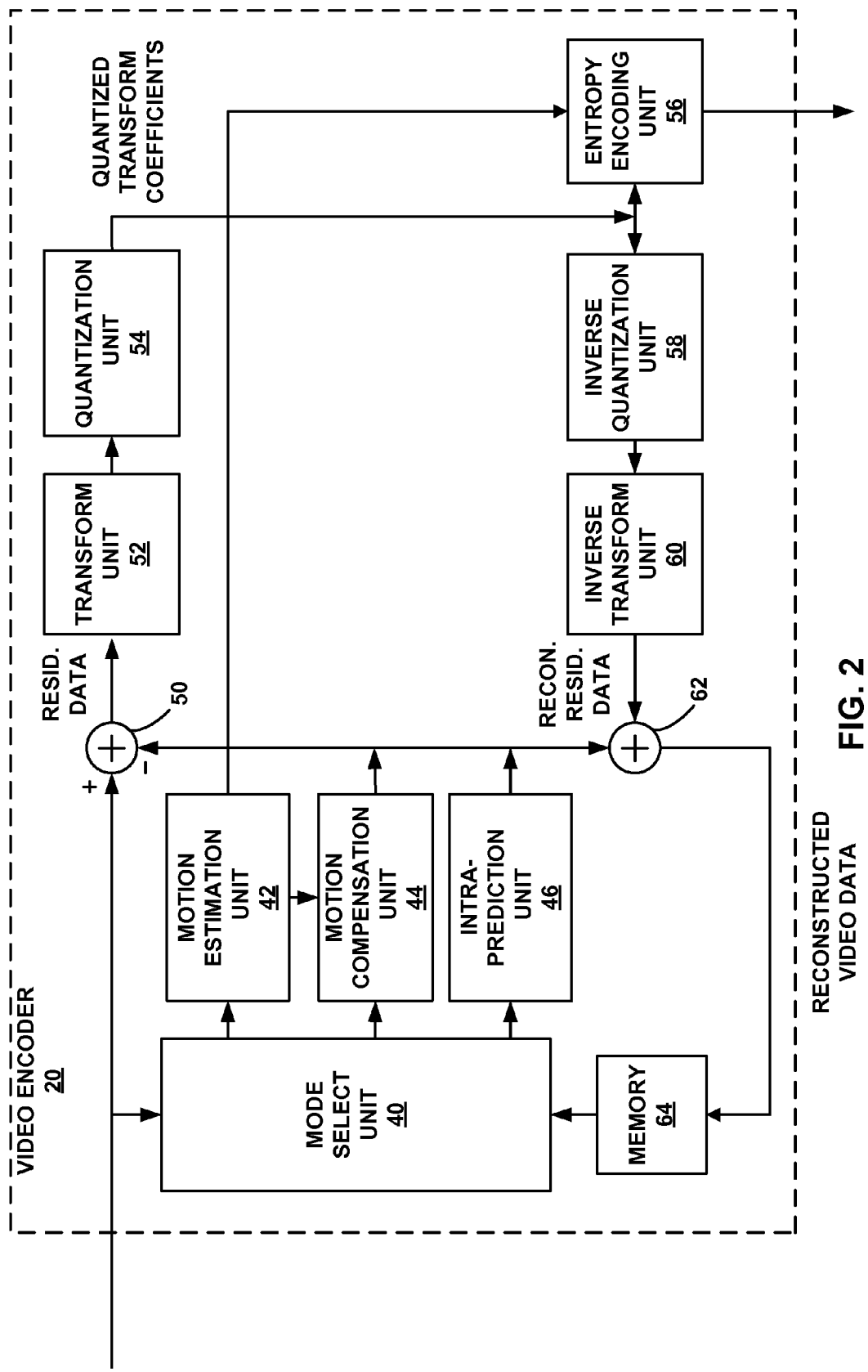
FIG. 2 is a block diagram illustrating an example of a video encoder that may implement the techniques described in this disclosure for restricting the range of MVPs.

FIG. 2 is a block diagram illustrating an example of video encoder 20 that may implement techniques for specifying motion vector predictors. Video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 2, it should be understood that video encoder 20 may further include components for intra-mode encoding. However, such components are not illustrated for the sake of brevity and clarity.

As shown in FIG. 2, video encoder 20 receives a current video block within a video frame to be encoded. In the example of FIG. 2, video encoder 20 includes motion compensation unit 44, motion estimation unit 42, memory 64, summer 50, transform unit 52, quantization unit 54, and entropy enencoding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. While described as including memory 64, which generally refers to random access memory (RAM), dynamic RAM (DRAM), static RAM (SRAM), Flash memory or other persistent or non-persistent chip-based storage medium, any type of non-transitory computer-readable medium may be utilized, including hard-drives, optical drives, disk drives, and the like.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra prediction unit 46 may also perform intra-predictive coding of the received video block relative to one or more neighboring blocks in the same frame or slice as the block to be coded to provide spatial compression.

As further shown in the example of FIG. 2, video encoder 20 also includes a mode select unit 40. Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in memory 64. Motion compensation unit 44 may also interpolate sub-integer pixels of the reference frame, e.g., an I-frame or a P-frame. The emerging HEVC standard (and the ITU H.264 standard) stores reference frames by way of one or more list data structures, which are commonly referred to as "lists." Therefore, data stored in memory 64 may also be considered lists. Motion estimation unit 42 compares blocks of one or more reference frames (or lists) from memory 64 to a block to be encoded of a current frame, e.g., a P-frame or a B-frame. When the reference frames in memory 64 include values for sub-integer pixels, a motion vector calculated by motion estimation unit 42 may refer to a sub-integer pixel location of a reference frame. Motion estimation unit 42 sends the calculated motion vector to entropy enencoding unit 56 and motion compensation unit 44. The reference frame block (which may comprise a CU) identified by a motion vector may be referred to as a predictive block. Motion compensation unit 44 calculates error values for the predictive block of the reference frame.

Motion compensation unit 44 may calculate prediction data based on the predictive block. Video encoder 20 forms a residual video block by subtracting the prediction data from motion compensation unit 44 from the original video block being coded. Summer 50 represents the component or components that perform this subtraction operation. Transform unit 52 applies a transform, such as a discrete cosine transform (DCT) or a conceptually similar transform, to the residual block, producing a video block comprising residual transform coefficient values. Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy enencoding unit 56 entropy codes the quantized transform coefficients. For example, entropy enencoding unit 56 may perform content adaptive variable length coding (CAVLC), context adaptive binary arithmetic coding (CABAC), or another entropy coding technique. Following the entropy coding by entropy enencoding unit 56, the encoded video may be transmitted to another device or archived for later transmission or retrieval. In the case of context adaptive binary arithmetic coding, context may be based on neighboring macroblocks.

In some cases, entropy enencoding unit 56 or another unit of video encoder 20 may be configured to perform other coding functions, in addition to entropy coding. For example, entropy enencoding unit 56 may be configured to determine the CBP values for the macroblocks and partitions. Also, in some cases, entropy enencoding unit 56 may perform run length coding of the coefficients in a macroblock or partition thereof. In particular, entropy enencoding unit 56 may apply a zig-zag scan or other scan pattern to scan the transform coefficients in a macroblock or partition and encode runs of zeros for further compression. Entropy enencoding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of a reference frame store in memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in the reference frame store of memory 64. The reconstructed video block may be used by motion estimation unit 42 and motion compensation unit 44 as a reference block to inter-code a block in a subsequent video frame.

As noted above, motion estimation unit 42 may, in some instances, not calculate a motion vector but instead determine a list of candidate motion vectors (e.g., a so-called "candidate list"), four of which are spatial candidate motion vectors and one of which is a temporal candidate motion vector. Typically, motion estimation unit 42 forgoes motion vector calculation in order to reduce the computation complexity of motion estimation and thereby improve the speed with which video data may be encoded while also reducing power consumption.

In accordance with the techniques described in this disclosure, motion estimation unit 42 may determine a plurality of candidate motion vectors for a current block of the video data so as to perform a motion vector prediction process and scale one or more of the plurality of candidate motion vectors determined for the current block of the video data to generate one or more scaled candidate motion vectors. As noted above, this scaling process may be based on a difference between picture order counts for the reference and current frame. More specifically, motion estimation unit 42 may determine a so-called distance scale factor (which may be represented in HEVC as a "DistScaleFactor" variable) when a motion vector predictor is derived from a candidate motion vector pointing to a different reference picture or frame.

In this motion vector scaling process, motion estimation unit 42 may compute the DistScaleFactor, which may be defined by the following equation (1):

$$\text{DistScaleFactor} = (POC_{curr} - POC_{ref})/(POC_{mvp\_blk} - POC_{mvp\_blk\_ref}) = tb/td. \quad (1)$$

In equation (1), POC refers to the picture order count, where $POC_{curr}$ denotes the picture order count for the current picture or frame, $POC_{ref}$ refers to the picture order count of the reference frame or picture, $POC_{mvp\_blk}$ denotes the picture order count of the frame or picture in which the candidate or neighboring block having the selected one of the candidate motion vector (or, in other words, the MVP) resides and $POC_{mvp\_blk\_ref}$ denotes the picture order count of the picture or frame in which the reference block to which the MVP points resides. The variable "td" in equation (1)

therefore represents the picture order count difference (or, in other words, distance) between the block MVP_BLK and its reference block, while the variable "tb" in equation (1) represents the POC distance between the current block and its reference block.

Motion estimation unit 42 may further compute a scaling factor, denoted as "tx," in accordance with the following equation (2):

$$tx=(16384+\text{Abs}(td/2))/td \quad (2)$$

Motion estimation unit 42 may then compute the DistScaleFactor in accordance with the following equation (3):

$$\text{DistScaleFactor}=\text{Clip3}(-4096,4095,(tb*tx+32)>>6) \quad (3)$$

DistanceScaleFactor may therefore be computed as a function of tb and tx, but clipped to be within a specified range of −4096 and 4095. Using this DistScaleFactor, motion estimation unit 42 may scale one or more of the candidate motion vectors in accordance with the following equation (4):

$$\text{ScaledMV}=\text{sign}(\text{DistScaleFactor}\times MV)\times((\text{abs}(\text{DistScaeFactor}\times MV)+127))>>8) \quad (4)$$

In equation (4), ScaledMV denotes a scaled candidate motion vector, "sign" refers to a function that keeps signs, "abs" refers to a function that computes the absolute value of the value and ">>" denotes bit-wise right shift.

As noted above, the ScaledMV based on POC distances may exceed the specified range (which may be referred to as a "motion vector range" or, alternatively, "range"), which may be defined according to a video encoding profile or level. As a result, motion estimation unit 42 may perform the techniques described in this disclosure to modify the scaled candidate motion vectors to be within a specified range. Moreover, motion estimation unit 42 may modify the scaled candidate motion vectors without modifying any of the other candidate motion vectors that have not been scaled.

Motion estimation unit 42 may modify the scaled candidate motion vectors in a number of ways. For example, motion estimation unit 42 may clip a vertical component of the scaled candidate motion vector to stay within the bounds of the motion vector range. In other words, motion estimation unit 42 may effectively limit the vertical motion vector value to the maximum/minimum vertical motion vector component range.

As another example, motion estimation unit 42 may scale the scaled candidate motion vector to stay within the bounds of the motion vector range. To illustrate, for a given scaled motion vector having a horizontal component (mv_x) and a vertical component (mv_y) that exceeds the specified range of the vertical motion vector limits, motion estimation unit 42 may limit the y-components to mv_y', which corresponds to the vertical MV limit. Motion estimation unit 42 may also scale the horizontal component, mv_x according to the following equation (5):

$$mv\_x'=mv\_x*mv\_y'/mv\_y \quad (5)$$

In equation (5), mv_x' denotes the scaled horizontal component of the scaled candidate motion vector. Motion estimation unit 42 may perform this scaling operation expressed as equation (5) at various precision levels using approximations of the division operation to produce a modified scaled motion vector having potentially both a modified horizontal component, mv_x', and a modified vertical component, mv_y'.

Although described above with respect to a number of different ways by which to modify one or more of the scaled motion vectors, the techniques may be performed in any number of ways to modify the candidate motion vectors when performing a motion vector prediction process. For example, motion estimation unit 42 may clip the scaled candidate motion vectors prior to selecting one of the plurality of candidate motion vectors as a motion vector predictor for the current block of the video data.

As yet another example, motion estimation unit 42 may clip a vertical component of the scaled candidate motion vectors to be within a vertical specified range and clip a horizontal component of the scaled candidate motion vectors to be within a horizontal specified range. In these instances, the clipping operations may conform to the following equation (6):

$$mvLXA=\text{Clip3}(-32768,32767,\text{Sign2}(\text{distScaleFactor}*mvLXA)*((\text{Abs}(\text{distScaleFactor}*mvLXA)+127)>>8)) \quad (6)$$

In equation (6), the clipping equation includes the scaling equation shown above as equation (4), clipping one or both of the horizontal and vertical components of the scaled motion vector to a specified range of −32768 through 32767. The scaled motion vector is denoted in equation (6) as "mvLXA." In other words, the specified range may be specified as [−32768, 32767] in quarter pixel units, where this specified range may, in some instances, be fixed and hard-coded in one or more of a video decoder and a video encoder.

In some instances, the specified range may specify, as noted above, a motion vector displacement limit that includes a vertical displacement limit, where motion estimation unit 42 may clip a vertical component of the scaled candidate motion vectors such that the vertical component of the scaled candidate motion vectors is within the vertical displacement limit.

In some instances, rather than clip both the horizontal and vertical components, motion estimation unit 42 may only clip the horizontal component of the scaled candidate motion vector. Again, the specified range may specify a motion vector displacement limit that includes a horizontal displacement limit, and motion estimation unit 42 may clip a horizontal component of the scaled candidate motion vectors such that the horizontal component of the scaled candidate motion vectors is within the horizontal displacement limit. As noted above, motion estimation unit 42 may clip one of the horizontal or vertical components and then scale the other non-clipped component (which may be the vertical component and should not be limited to the example above) such that the scaled candidate motion vectors is bounded by the one or more motion vector displacement limits. Accordingly, the techniques should not be limited to any one of the example modification described above.

To select one of the candidate motion vectors as the motion vector predictor, motion compensation unit 44 may then identify a reference frame block (which, again, may be referred to as prediction block) for each candidate motion vectors included in the list. Motion compensation unit 44 may then calculate prediction data based on the predictive block determined for each of the candidate motion vectors. Video encoder 20 may then determine residual data for each prediction data computed for a corresponding one of the candidate motion vectors, transform the residual data, quantize the transcoded residual data and then entropy encode the quantized residual data in the manner described above. Video encoder 20 may then perform inverse operations to decode this entropy encoded residual data generated with respect to teach of the candidate motion vectors remaining after pruning to reproduce reference data in the form of reconstructed video blocks. Mode select unit 40 may analyze each of the reconstructed video blocks generated with respect to each of the candidate motion vectors to select one of the candidate motion vectors. Mode select unit 40 may select the one of candidate motion vectors that provides the best rate-to-distortion ratio through a process commonly referred to as "rate-distortion optimization," which is typically abbreviated as "RDO."

RDO generally involves comparing a reconstructed frame, slice or block compressed to achieve a certain rate (which generally refers to a bitrate at which the compressed video data that includes the compressed frame, slice or block can be sent) with the original frame, slice or block and determining an amount of distortion between the original frame, slice or block and the reconstructed frame, slice or block at the given rate. Mode select unit 40 may encode the same video data using multiple different metrics that achieve or attempt to achieve a given rate, performing the distortion optimization process with respect to these various metrics. In this instance, mode select unit 40 may compare the RD output of each reconstructed video block and select the one that provides the least distortion at the target rate.

Mode select unit 40 may then indicate this selection to motion estimation unit 42, which proceeds to interface with entropy encoding unit 56 to inform entropy encoding unit 56 of the selection. Typically, motion estimation unit 42 interfaces with entropy encoding unit 56 to indicate that motion vector prediction was performed along with the index identifying the selected candidate motion vector. As noted above, motion estimation unit 42 may arrange candidate motion vectors in a defined manner, such as by highest amplitude to lowest amplitude or lowest amplitude to highest amplitude or in any other defined way. Alternatively, motion estimation unit 42 may also signal to entropy encoding unit 56 a way by which the candidate motion vectors were arranged in this candidate list. Entropy encoding unit 56 may then encode this index along with any other information that may be necessary to indicate that the motion vector prediction process was performed to encode motion data. Entropy encoding unit 56 may output the encoded index as a syntax element (which may be denoted as "mvp_idx") in a bitstream, which may be stored or transmitted in the manner described above with respect to the example of FIG. 1. In this manner, video encoder 20 may select one of the plurality of candidate motion vectors as a motion vector predictor for the current block of the video data and code the current block of video data based on motion vector predictor.

In some instances, entropy encoding unit 56 performs a form of entropy coding referred to as context adaptive binary arithmetic coding (CABAC). In performing CABAC, entropy encoding unit 56 may select one of a plurality of so-called contexts (which are different code tables specified for different context so as to more efficiently compress video data associated with the corresponding context) and encodes the compressed residual data according to the code table defined for the selected context. Entropy encoding unit 56 may select one of the contexts based on context information, which may include the reference index determined when performing motion vector prediction, the number of unique motion vector candidates and the prediction direction determined when performing motion vector prediction.

Figure 3:
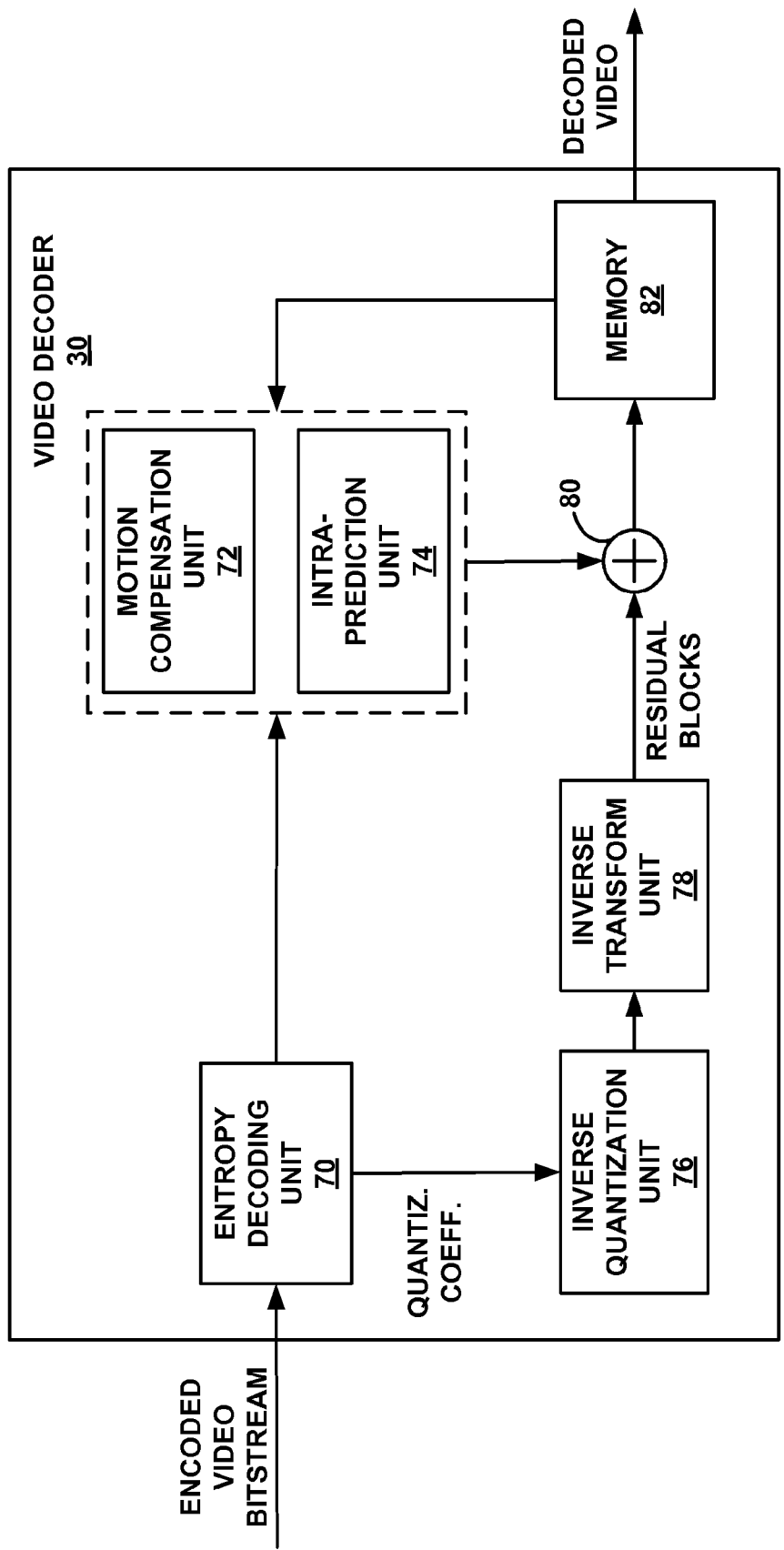
FIG. 3 is a block diagram illustrating an example of a video decoder that implements the motion vector prediction techniques described in this disclosure.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, memory 82 and summer 80. Video decoder 30 may, in some examples, perform a decoding pass generally reciprocal to the encoding pass described with respect to a video encoder, such as video encoder 20 shown in the examples of FIGS. 1 and 2. Although generally reciprocal, video decoder 30 may, in some instances, perform techniques similar to those performed by video encoder 20. In other words, video decoder 30 may perform substantially similar processes to those performed by video encoder 20. Moreover, as described above, video encoder 20 may perform video decoding in the process of performing video encoding. To illustrate, inverse quantization unit 58, inverse transform unit 60, and summer 62 of video encoder 20 may perform operations substantially similar to inverse quantization unit 76, inverse transform unit 78 and summer 80 of video decoder 30.

As shown in the example of FIG. 3, entropy decoding unit 70 receives an encoded bitstream, which for purposes of illustration is assumed to include a unary or truncated unary coded index identifying a selected candidate motion vector (where, again, these candidate motion vectors may be referred to as candidate motion vectors or candidate motion vector predictors ("candidate MVPs")). Entropy decoding unit 70 may, in performing a process generally reciprocal to entropy encoding unit 56 of video encoder 20, receive a syntax element or other coding data for the current PU indicating that a motion vector prediction process was performed to determine a motion vector for the current PU. In response to this syntax element or other coding data, entropy decoding unit 70 parses the motion vector predictor index (mvp_idx) from the bitstream, providing this motion vector predictor index to motion compensation unit 72. Entropy decoding unit 70 also decodes the encoded block of video data to which this motion vector predictor index is associated, providing this encoded block of video data to inverse quantization unit 76.

Motion compensation unit 72 retrieves spatial candidate motion vectors for PUs adjacent to the current PU and a temporal candidate motion vector for a co-located PU in the reference frame. Entropy decoding unit 70 may also provide motion compensation unit 72 with the reference frame identified for the current PU (typically as another syntax element in the bitstream). Alternatively, motion compensation unit 72 may be configured with regard to either the AMVP or merge mode to retrieve the temporal candidate motion vector from a reference frame identified in a set manner (e.g., such as one, two or any other number back or forward from the current frame in which the current PU is located).

Motion compensation unit 72 may then construct the candidate list that includes the four spatial candidate motion vectors and the temporal candidate motion vector. In generating this candidate list, motion compensation unit 72 may scale one or more of the plurality of candidate motion vectors determined for the current block of the video data to generate one or more scaled candidate motion vectors. As noted above, this scaling process may be based on a difference between picture order counts for the reference and current frame. Moreover, the scaled motion vector based on POC distances may exceed the specified range (which may be referred to as a "motion vector range"), which may be defined according to a video encoding profile or level. As a result, motion compensation unit 72 may perform the techniques described in this disclosure to modify the scaled candidate motion vectors to be within a specified range. Moreover, motion compensation unit 72 may modify the scaled candidate motion vectors without modifying any of the other candidate motion vectors that have not been scaled.

Motion compensation unit 72 may modify the scaled candidate motion vectors in any number of the ways described above with respect motion estimation unit 42 of video encoder 20 shown in the examples of FIGS. 1, 2. For example, motion compensation unit 72 may clip a vertical component of the scaled candidate motion vector to stay within the bounds of the motion vector range. In other words, motion compensation unit 72 may effectively limit the vertical motion vector value to the maximum/minimum vertical motion vector component range. Motion compensation unit 72 may also clip a horizontal component of the scaled candidate motion vector to stay within the bounds of the motion vector range. In other words, motion compensation unit 72 may effectively limit the horizontal motion vector value to the maximum/minimum horizontal motion vector component range.

As another example, motion compensation unit 72 may scale the scaled candidate motion vector to stay within the bounds of the motion vector range. To illustrate, for a given scaled motion vector having a horizontal component (mv_x) and a vertical component (mv_y) that exceeds the specified range of the vertical motion vector limits, motion compensation unit 72 may limit the y-components to mv_y', which corresponds to the vertical MV limit.

In any event, after forming this candidate list, motion compensation unit 72 then selects the one of the candidate motion vectors from the candidate list identified by the motion vector predictor index. For an inter-coded block, motion compensation unit 72 may then generate inter-prediction data based on the identified motion vector. Motion compensation unit 72 may use this motion vector to identify a prediction block in reference frames stored to memory 82. For intra-coded blocks, intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by summer 50 for each macroblock to determine a degree of quantization and, likewise, a degree of inverse quantization that should be applied.

Inverse transform unit 60 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of CUs used to encode frame(s) of the encoded video sequence, partition information that describes how each CU of a frame of the encoded video sequence is partitioned, modes indicating how each CU is encoded, one or more reference frames (or lists) for each inter-encoded CU, and other information to decode the encoded video sequence.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in a reference frame store in memory 82, which may be referred to as a decoded picture buffer in the HEVC standard, which provides reference blocks for subsequent motion compensation and also produces decoded video for presentation on a display device (such as display device 32 of FIG. 1).

In some instances, the temporal candidate motion vector may not be available, such as when a slice that specifies the temporal candidate motion vector is lost, i.e., not recovered or received in the encoded bistream as one example. When this temporal candidate motion vector is unavailable, motion compensation unit 72 may set this temporal candidate motion vector to a default value or otherwise determine default motion vector information for this temporal candidate motion vector. In some instances, this default motion vector information for the temporal candidate motion vector may be reconstructed depending on whether the reference frame was intra-coded. When the reference frame is determined to be intra-coded, motion compensation unit 72 may derive the default motion vector information for a default candidate motion vector based on spatial motion vectors determined for the portion of the reference frame co-located in the same location of the reference frame as the current portion is in the current frame. Likewise, one or more of the temporally predicted spatial candidate motion vectors may be unavailable or lost and may derive the default motion vector information for a default candidate motion vector based on spatial motion vectors determined for the portion of the reference frame co-located in the same location of the reference frame as the current portion is in the current frame.

As noted above, there are two types of motion vector prediction: merge mode and AMVP. For merge mode, motion compensation unit 72 determines the motion vector amplitude, prediction direction and reference index when determining the default motion information. For AMVP, motion compensation unit 72 determines a motion vector amplitude but need not determine the prediction direction and reference index as these are signaled separately in the bitstream for the current PU. Thus, motion compensation unit 72 may base the determination of the default motion information based on the mode signaled for performing motion vector prediction, i.e., whether the type of motion vector prediction signaled is merge mode or AMVP for the current PU.

Figure 4:
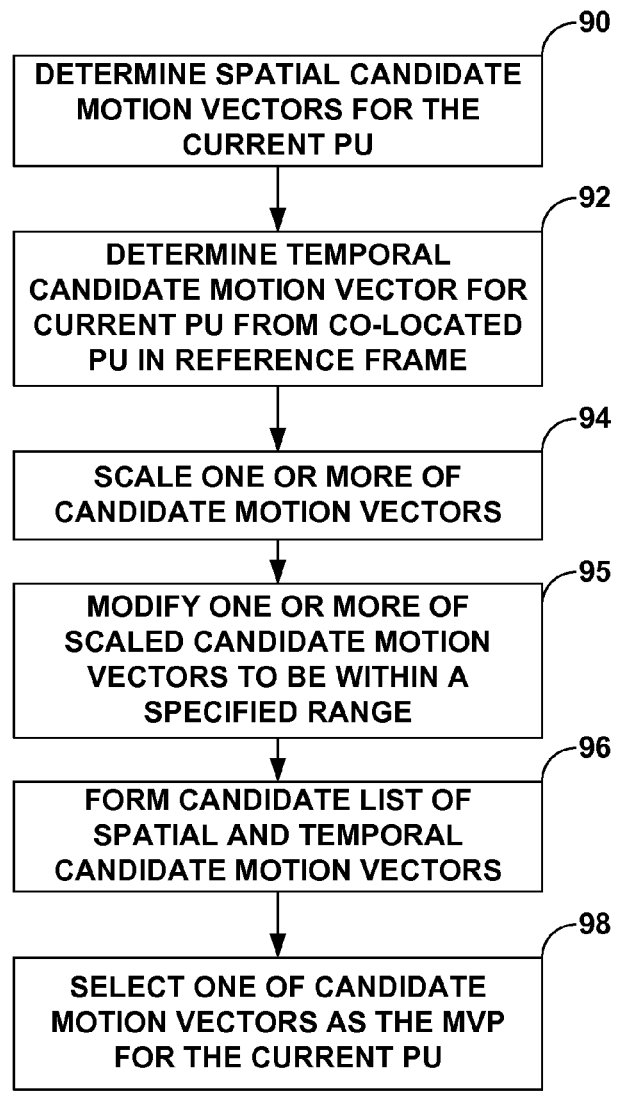
FIG. 4 is a flowchart illustrating exemplary operation of a video coder in performing aspects of the motion vector prediction techniques described in this disclosure.

FIG. 4 is a flowchart illustrating exemplary operation of a video coder, such as video encoder 20 shown in the example of FIG. 2 and/or video decoder 30 shown in the example of FIG. 3, in performing aspects of the motion vector prediction techniques described in this disclosure. Initially, referring first to video encoder 20, motion estimation unit 42 may, as described above, determine spatial candidate motion vectors for a current PU corresponding to a current CU (90). Motion estimation unit 42 may next determine a temporal candidate motion vector for the current PU from a co-located PU in a reference frame, again, as described above (92). In determining either or both of the spatial candidate motion vectors and the temporal candidate motion vector, motion estimation unit 42 may scale one or more of the candidate motion vectors in the manner described above (94). Additionally, motion estimation unit 42 may modify one or more of the scaled motion vectors, as described above (95).

After modifying the one or more scaled motion vectors, motion estimation unit 42 may form a candidate list of spatial and temporal candidate motion vectors and select one of the candidate motion vectors as the MVP for the current PU (96, 98). This selection may, as noted above, involve video encoder 20 performing a RDO analysis, where the selected one of the candidate motion vectors is then used to code the block of video data in the manner described above. Entropy encoding unit 56 may specify the selected one of the candidate motion vectors as a motion vector predictor index (mvp_idx) in the bitstream, thereby enabling the video decoder to identify the selected one of the candidate motion vectors.

With respect to video decoder 30, motion compensation unit 72 may perform similar operations as those described above with respect to motion estimation unit 42. That is, motion compensation unit 72 may, as described above, determine spatial candidate motion vectors for a current PU corresponding to a current CU (90). Motion compensation unit 72 may next determine a temporal candidate motion vector for the current PU from a co-located PU in a reference frame, again, as described above (92). In determining either or both of the spatial candidate motion vectors and the temporal candidate motion vector, motion compensation unit 72 may scale one or more of the candidate motion vectors in the manner described above (94). Additionally, motion compensation unit 72 may modify one or more of the scaled motion vectors to be within a specified range, as described above (95).

After modifying the one or more scaled motion vectors, motion compensation unit 72 may form a candidate list of spatial and temporal candidate motion vectors and select one of the candidate motion vectors as the MVP for the current PU (96, 98). Entropy decoding unit 70 may parse the motion vector predictor index (mvp_idx) from the bitstream and provide this motion vector predictor index to motion compensation unit 72 for use in selecting the one of the candidate motion vectors as the MVP for the current PU.

Figure 5:
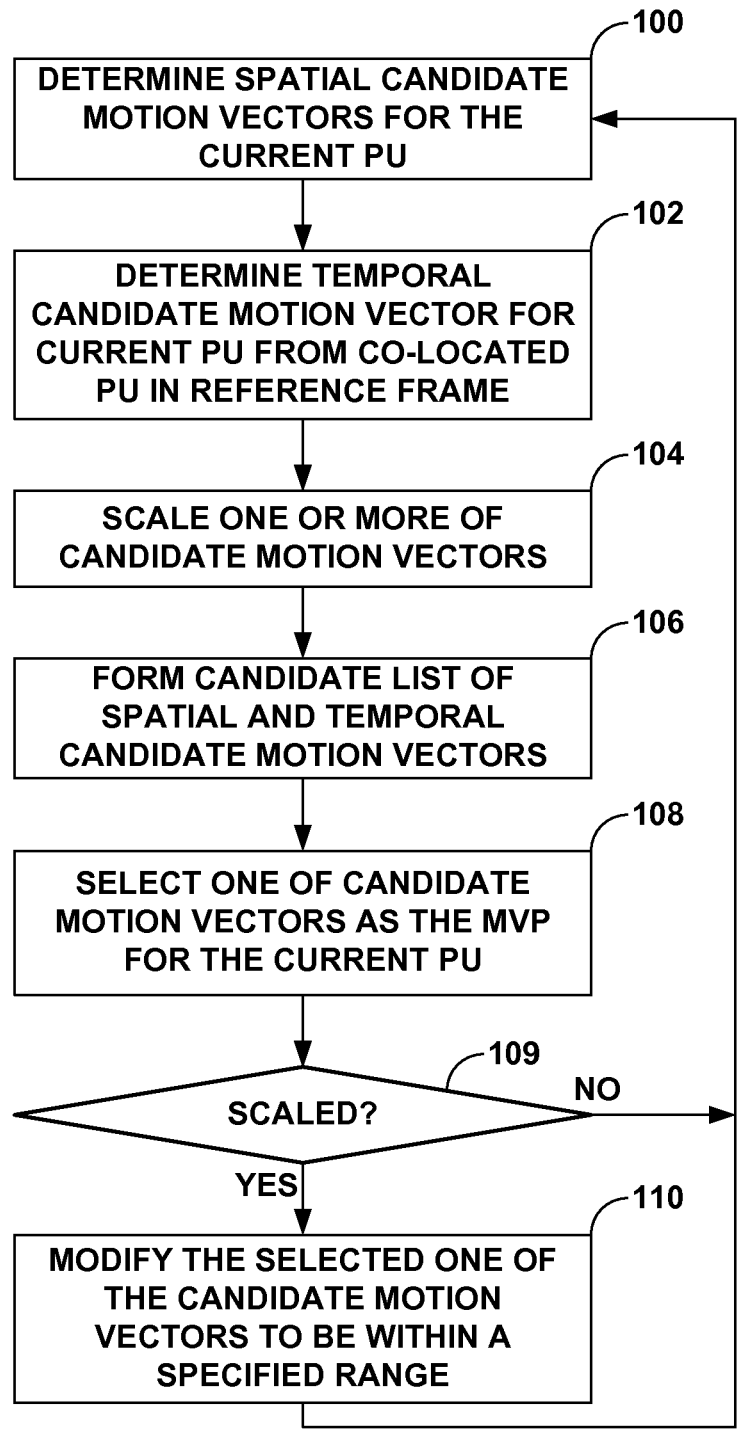
FIG. 5 is a flowchart illustrating exemplary operation of a video coder in implementing other aspects of the motion vector prediction techniques described in this disclosure.

FIG. 5 is a flowchart illustrating exemplary operation of a video coder, such as video encoder 20 shown in the example of FIG. 2 and/or video decoder 30 shown in the example of FIG. 3, in performing other aspects of the motion vector prediction techniques described in this disclosure. Initially, referring first to video encoder 20, motion estimation unit 42 may, as described above, determine spatial candidate motion vectors for a current PU corresponding to a current CU (100). Motion estimation unit 42 may next determine a temporal candidate motion vector for the current PU from a co-located PU in a reference frame, again, as described above (102). In determining either or both of the spatial candidate motion vectors and the temporal candidate motion vector, motion estimation unit 42 may scale one or more of the candidate motion vectors in the manner described above (104).

Next, motion estimation unit 42 may form a candidate list of spatial and temporal candidate motion vectors and select one of the candidate motion vectors as the MVP for the current PU (106, 108). This selection may, as noted above, involve video encoder 20 performing a RDO analysis, where the selected one of the candidate motion vectors is then used to code the block of video data in the manner described above. Prior to performing this RDO analysis, motion estimation unit 42 may first determine whether the selected one of the candidate motion vectors has been scaled (109). If not scaled ("NO" 109), motion estimation unit 42 may not perform any additional operations in considering the current one of the candidate motion vectors. However, if scaled ("YES" 109), motion estimation unit 42 may modify the selected one of the candidate motion vectors to be within a specified range in the manner described above (110). As noted above, entropy encoding unit 56 may specify the selected one of the candidate motion vectors as a motion vector predictor index (mvp_idx) in the bitstream, thereby enabling the video decoder to identify the selected one of the candidate motion vectors.

With respect to video decoder 30, motion compensation unit 72 may, as described above, determine spatial candidate motion vectors for a current PU corresponding to a current CU (100). Motion compensation unit 72 may next determine a temporal candidate motion vector for the current PU from a co-located PU in a reference frame, again, as described above (102). In determining either or both of the spatial candidate motion vectors and the temporal candidate motion vector, motion compensation unit 72 may scale one or more of the candidate motion vectors in the manner described above (104).

Next, motion compensation unit 72 may form a candidate list of spatial and temporal candidate motion vectors and select one of the candidate motion vectors as the MVP for the current PU (106, 108). To select the one of the candidate motion vectors, entropy decoding unit 70 may parse the motion vector predictor index (mvp_idx) from the bitstream and provide this motion vector predictor index to motion compensation unit 72 for use in selecting the one of the candidate motion vectors as the MVP for the current PU. Motion compensation unit 72 may then determine whether the selected one of the candidate motion vectors has been scaled (109). If not scaled ("NO" 109), motion compensation unit 72 may not perform any additional operations in considering the current one of the candidate motion vectors. However, if scaled ("YES" 109), motion compensation unit 72 may modify the selected one of the candidate motion vectors in the manner described above (110).

Figure 6:
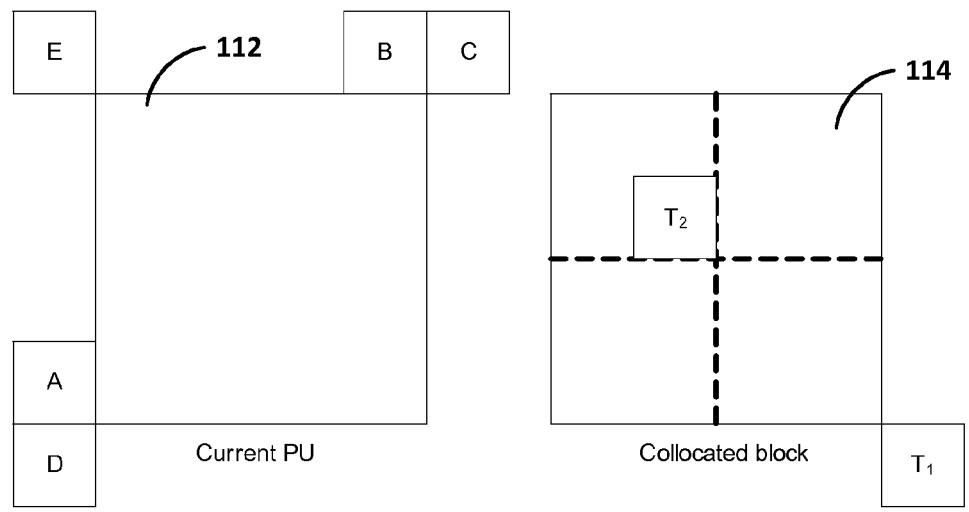
FIG. 6 is a diagram illustrating an exemplary arrangement of adjacent neighboring predictive units (PUs) and a temporal co-located PU for a current PU.

FIG. 6 is a conceptual diagram illustrating spatial and temporal neighboring blocks from which motion vector predictor candidates are generated for motion vector prediction modes. In the current HEVC test model (HM), two motion vector prediction modes are supported: merge mode and adaptive motion vector prediction (AMVP) mode. In either mode, each of video encoder 20 and video decoder 30 generates the same motion vector predictor candidate list from which to determine a motion vector for a current video block or PU 112. The motion vector predictor candidates in the merge mode and AMVP mode may include motion vectors for spatial neighboring blocks of current PU 112, for example, neighboring blocks A, B, C, D and E illustrated in FIG. 6. The motion vector predictor candidates may also include motion vectors for temporal neighboring blocks of a collocated block 114 of current PU 112, for example, neighboring blocks $T_1$ and $T_2$ illustrated in FIG. 4. In some cases, the motion vector predictor candidates may include combinations of motion vectors for two or more of the neighboring blocks, e.g., an average, median, or weighted average of the two or more motion vectors.

In the case of the AMVP mode, the motion vector predictor candidate list may be generated to include the motion vectors for the spatial or temporal neighboring blocks. Video encoder 20 then selects the most accurate motion vector predictor candidate for current PU 112 from the candidate list. In one example, video encoder 20 may select a motion vector predictor candidate generated from the motion vector of one of the neighboring blocks as the motion vector predictor for current PU 112. In another example, video encoder 20 may select a motion vector predictor candidate generated from the motion vectors of two or more of the neighboring blocks as the motion vector predictor for current PU 112. In this case, the motion vector predictor may be calculated as the average, median, or weighted average value of the two or more motion vectors. Video encoder 20 then determines the motion vector difference between the motion vector predictor and a motion vector for current PU 112. Video encoder 20 then signals the motion vector difference and a motion vector predictor index for current PU 112 to video decoder 30.

Video decoder 30 receives a bitstream representing an encoded video block including motion vector differences and motion vector predictor indexes for the video block. To decode the video block, video decoder 30 generates a motion vector predictor candidate list in the same manner as video encoder 20. Video decoder 30 selects a motion vector predictor for current PU 112 by applying the signaled motion vector predictor index for current PU 112 to the candidate list. Video decoder 30 then combines the signaled motion vector difference with the selected motion vector predictor to reconstruct the motion vector for current PU 112. Video decoder 30 uses the motion vector for current PU 112 to locate a predictive block in a reference picture to reconstruct the encoded video block.

In the case of the merge mode, the motion vector predictor candidate list may be generated to include all the motion information, including the motion vector, the reference picture index, and the prediction direction, for each of the spatial or temporal neighboring blocks. Video encoder 20 then selects the most accurate motion information for current PU 112 from the neighboring blocks in the candidate list. Instead of signaling a motion vector difference, a reference picture index, and a prediction direction for current PU 112 to video decoder 30, video encoder 20 directly uses the selected motion information for the neighboring block as the final motion information for current PU 112. In this way, video encoder 20 only signals an index to indicate the neighboring block from which all the motion information should be derived for current PU 112 to video decoder 30.

Video decoder 30 receives a bitstream representing an encoded video block including index values for the video block. To decode the video block, video decoder 30 generates a motion vector predictor candidate list in the same manner as video encoder 20. Video decoder 30 determines all the motion information, including the motion vector, the reference picture index, and the prediction direction, for current PU 112 by applying the signaled index to the candidate list to select the motion information of the neighboring block. Video decoder 30 then uses the motion vector for current PU 112 to locate a predictive block to reconstruct the encoded video block.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    determining, to perform a motion vector prediction process, a plurality of candidate motion vectors for a current block in a current picture of the video data based on motion vectors determined for spatially neighboring blocks and a temporally co-located block to the current block;
    scaling, based on a picture order count value associated with the current picture, one or more of the plurality of candidate motion vectors determined for the current block of the video data to generate one or more scaled candidate motion vectors;
    clipping the one or more scaled candidate motion vectors to be within a specified range, the specified range being in quarter pixel units, and the plurality of candidate motion vectors including the clipped scaled candidate motion vectors;

selecting, after clipping the one or more scaled candidate motion vectors, one of the plurality of candidate motion vectors as a motion vector predictor for the current block of the video data; and coding the current block of video data based on motion vector predictor.

2. The method of claim 1, wherein clipping the one or more scaled candidate motion vectors comprises clipping the one or more scaled candidate motion vectors without clipping any of the other candidate motion vectors that have not been scaled.

3. The method of claim 1, wherein the motion vector prediction process is one of a merge mode and an advanced motion vector prediction mode.

4. The method of claim 1, wherein the specified range is defined by a video coding profile or level.

5. The method of claim 1, wherein the specified range is fixed and hard-coded in one or more of a video decoder and a video encoder.

6. The method of claim 1, wherein clipping the one or more scaled motion vectors includes:
clipping a vertical component of the one or more scaled candidate motion vectors to be within a vertical specified range; and
clipping a horizontal component of the one or more scaled candidate motion vectors to be within a horizontal specified range.

7. The method of claim 1,
wherein the specified range specifies a motion vector displacement limit that includes a vertical displacement limit,
wherein the scaled candidate motion vectors extends beyond the vertical displacement limit, and
wherein clipping the one or more scaled candidate motion vectors further comprises clipping a vertical component of the one or more scaled candidate motion vectors such that the vertical component of the one or more scaled candidate motion vectors is within the vertical displacement limit.

8. The method of claim 1,
wherein the specified range specifies a motion vector displacement limit that includes a horizontal displacement limit,
wherein the scaled candidate motion vectors extends beyond the horizontal displacement limit, and
wherein clipping the one or more scaled candidate motion vectors further comprises clipping a horizontal component of the one or more scaled candidate motion vectors such that the horizontal component of the one or more scaled candidate motion vectors is within the horizontal displacement limit.

9. The method of claim 1, wherein clipping the one or more scaled candidate motion vectors comprises scaling the one or more scaled candidate motion vectors such that the one or more scaled candidate motion vectors is bounded by the one or more motion vector displacement limits.

10. The method of claim 1, further comprising determining a motion vector for the current block of video data based on the selected one of the plurality of candidate motion vectors for the current block of video data, wherein the determined motion vector identifies a prediction block of video data,
wherein coding the current block of video data comprises decoding the current block of video data with respect to the prediction block of video data.

11. The method of claim 1, further comprising determining a motion vector for the current block of video data based on the selected one of the plurality of candidate motion vectors for the current block of video data, wherein the determined motion vector identifies a prediction block of video data and,
wherein coding the current block of video data comprises encoding the current block of video data with respect to the prediction block of video data.

12. The method of claim 1, further comprising:
decoding a motion vector predictor index to identify the selected one of the plurality of candidate motion vectors for the current block of video data so as to perform an advanced motion vector prediction mode of the motion vector prediction process; and
decoding a motion vector difference between the selected one of the plurality of candidate motion vectors and a motion vector for the current block of video data to determine a motion vector for the current block of video data,
wherein coding the current block of video data comprises decoding the current block of video data using the determined motion vector for the current block of video data.

13. The method of claim 1, further comprising:
decoding an index to identify the selected one of the plurality of candidate motion vectors for the current block of video data so as to perform a merge mode of the motion vector prediction process; and
determining a motion vector for the current block of video data to be equivalent to the selected one of the plurality of candidate motion vectors,
wherein coding the current block of video data comprises decoding the current block of video data using the determined motion vector for the current block of the video data.

14. A video coding device configured to perform a motion vector prediction process to code video data, the video coding device comprising:
a memory configured to store a current block of the video data; and
a processor configured to:
determine, to perform a motion vector prediction process, a plurality of candidate motion vectors for the current block in a current picture of the video data based on motion vectors determined for spatially neighboring blocks and a temporally co-located block to the current block;
scale, based on a picture order count value associated with the current picture, one or more of the plurality of candidate motion vectors determined for the current block of the video data to generate one or more scaled candidate motion vectors;
clip the one or more scaled candidate motion vectors to be within a specified range, the specified range being in quarter pixel units, and the plurality of candidate motion vectors including the clipped scaled candidate motion vectors;
select, after clipping the one or more scaled candidate motion vectors, one of the plurality of candidate motion vectors as a motion vector predictor for the current block of the video data; and
code the current block of video data based on motion vector predictor.

15. The video coding device of claim 14, wherein the processor is configured to clip the one or more scaled candidate motion vectors without clipping any of the other candidate motion vectors that have not been scaled.

16. The video coding device of claim 14, wherein the motion vector prediction process is one of a merge mode and an advanced motion vector prediction mode.

17. The video coding device of claim 14, wherein the specified range is defined by a video coding profile or level.

18. The video coding device of claim 14, wherein the specified range is fixed and hard-coded in one or more of a video decoder and a video encoder.

19. The video coding device of claim 14, wherein the processor is configured to clip a vertical component of the one or more scaled candidate motion vectors to be within a vertical specified range and clip a horizontal component of the one or more scaled candidate motion vectors to be within a horizontal specified range.

20. The video coding device of claim 14,
wherein the specified range specifies a motion vector displacement limit that includes a vertical displacement limit,
wherein the one or more scaled candidate motion vectors extends beyond the vertical displacement limit, and
wherein the processor is further configured to clip a vertical component of the one or more scaled candidate motion vectors such that the vertical component of the one or more scaled candidate motion vectors is within the vertical displacement limit.

21. The video coding device of claim 14,
wherein the specified range specifies a motion vector displacement limit that includes a horizontal displacement limit,
wherein the one or more scaled candidate motion vectors extends beyond the horizontal displacement limit, and
wherein the processor is configured to clip a horizontal component of the one or more scaled candidate motion vectors such that the horizontal component of the one or more scaled candidate motion vectors is within the horizontal displacement limit.

22. The video coding device of claim 14, wherein the processor is configured to scale the one or more scaled candidate motion vectors such that the one or more scaled candidate motion vectors is bounded by the one or more motion vector displacement limits.

23. The video coding device of claim 14,
wherein the processor is further configured to determine a motion vector for the current block of video data based on the selected one of the plurality of candidate motion vectors for the current block of video data,
wherein the determined motion vector identifies a prediction block of video data and
wherein the processor is further configured to, when coding the current block of video data, decode the current block of video data with respect to the prediction block of video data.

24. The video coding device of claim 14,
wherein the processor is further configured to determine a motion vector for the current block of video data based on the selected one of the plurality of candidate motion vectors for the current block of video data,
wherein the determined motion vector identifies a prediction block of video data and;
wherein the processor is further configured to, when coding the current block of video data, encode the current block of video data with respect to the prediction block of video data.

25. The video coding device of claim 14, wherein the processor is further configured to decode a motion vector predictor index to identify the selected one of the plurality of candidate motion vectors for the current block of video data so as to perform an advanced motion vector prediction mode of the motion vector prediction process, decode a motion vector difference between the selected one of the plurality of candidate motion vectors and a motion vector for the current block of video data to determine a motion vector for the current block of video data, and, when coding the current block of video data, decode the current block of video data using the determined motion vector for the current block of video data.

26. The video coding device of claim 14, wherein the processor is further configured to decode an index to identify the selected one of the plurality of candidate motion vectors for the current block of video data so as to perform a merge mode of the motion vector prediction process, determine a motion vector for the current block of video data to be equivalent to the selected one of the plurality of candidate motion vectors, and, when coding the current block of video data, decoding the current block of video data using the determined motion vector for the current block of the video data.

27. A video coding device configured to perform a motion vector prediction process to code video data, the video coding device comprising:
means for determining, to perform a motion vector prediction process, a plurality of candidate motion vectors for a current block in a current picture of the video data based on motion vectors determined for spatially neighboring blocks and a temporally co-located block to the current block;
means for scaling, based on a picture order count value associated with the current picture, one or more of the plurality of candidate motion vectors determined for the current block of the video data to generate one or more scaled candidate motion vectors;
means for clipping the one or more scaled candidate motion vectors to be within a specified range, the specified range being in quarter pixel units, and the plurality of candidate motion vectors including the clipped scaled candidate motion vectors;
means for selecting, after clipping the one or more scaled candidate motion vectors, one of the plurality of candidate motion vectors as a motion vector predictor for the current block of the video data; and
means for coding the current block of video data based on motion vector predictor.

28. The video coding device of claim 27, wherein the means for clipping the one or more scaled candidate motion vectors comprising means for clipping the one or more scaled candidate motion vectors without clipping any of the other candidate motion vectors that have not been scaled.

29. The video coding device of claim 27, wherein the specified range is defined by a video coding profile or level.

30. The video coding device of claim 27, wherein the specified range is fixed and hard-coded in one or more of a video decoder and a video encoder.

31. The video coding device of claim 27, wherein the means for clipping the one or more scaled motion vectors includes:
means for clipping a vertical component of the one or more scaled candidate motion vectors to be within a vertical specified range; and
means for clipping a horizontal component of the one or more scaled candidate motion vectors to be within a horizontal specified range.

32. The video coding device of claim 27,
wherein the specified range specifies a motion vector displacement limit that includes a vertical displacement limit,
wherein the one or more scaled candidate motion vectors extends beyond the vertical displacement limit, and
wherein the means for clipping the one or more scaled candidate motion vectors further comprises means for clipping a vertical component of the one or more scaled candidate motion vectors such that the vertical component of the one or more scaled candidate motion vectors is within the vertical displacement limit.

33. The video coding device of claim 27,
wherein the specified range specifies a motion vector displacement limit that includes a horizontal displacement limit,
wherein the one or more scaled candidate motion vectors extends beyond the horizontal displacement limit, and
wherein the means for clipping the one or more scaled candidate motion vectors further comprises means for clipping a horizontal component of the one or more scaled candidate motion vectors such that the horizontal component of the one or more scaled candidate motion vectors is within the horizontal displacement limit.

34. A non-transitory computer-readable storage medium having instruction stored thereon that, when executed, cause one or more processors to:
determine, to perform a motion vector prediction process, a plurality of candidate motion vectors for a current block in a current picture of the video data based on motion vectors determined for spatially neighboring blocks and a temporally co-located block to the current block;
scale, based on a picture order count value associated with the current picture, one or more of the plurality of candidate motion vectors determined for the current block of the video data to generate one or more scaled candidate motion vectors;
clip the one or more scaled candidate motion vectors to be within a specified range, the specified range being in quarter pixel units, and the plurality of candidate motion vectors including the clipped scaled candidate motion vectors;
select, after clipping the one or more scaled candidate motion vectors, one of the plurality of candidate motion vectors as a motion vector predictor for the current block of the video data; and
code the current block of video data based on motion vector predictor.

35. The non-transitory computer-readable storage medium of claim 34, wherein the instructions, when executed, cause the one or more processors to clip the one or more scaled candidate motion vectors without modifying any of the other candidate motion vectors that have not been scaled.

36. The non-transitory computer-readable storage medium of claim 34, wherein the specified range is defined by a video coding profile or level.

37. The non-transitory computer-readable storage medium of claim 34, wherein the specified range is fixed and hard-coded in one or more of a video decoder and a video encoder.

38. The non-transitory computer-readable storage medium of claim 34, wherein the instructions, when executed, cause the one or more processors to:
clip a vertical component of the one or more scaled candidate motion vectors to be within a vertical specified range; and
clip a horizontal component of the one or more scaled candidate motion vectors to be within a horizontal specified range.

39. The non-transitory computer-readable storage medium of claim 34,
wherein the specified range specifies a motion vector displacement limit that includes a vertical displacement limit,
wherein the one or more scaled candidate motion vectors extends beyond the vertical displacement limit, and
wherein the instructions, when executed, cause the one or more processors to clip a vertical component of the one or more scaled candidate motion vectors such that the vertical component of the one or more scaled candidate motion vectors is within the vertical displacement limit.

40. The non-transitory computer-readable storage medium of claim 34,
wherein the specified range specifies a motion vector displacement limit that includes a horizontal displacement limit,
wherein the one or more scaled candidate motion vectors extends beyond the horizontal displacement limit, and
wherein the instructions, when executed, cause the one or more processors to clip a horizontal component of the one or more scaled candidate motion vectors such that the horizontal component of the one or more scaled candidate motion vectors is within the horizontal displacement limit.

* * * * *